(12) United States Patent
Satish et al.

(10) Patent No.: US 8,806,046 B1
(45) Date of Patent: Aug. 12, 2014

(54) APPLICATION STREAMING AND NETWORK FILE SYSTEM OPTIMIZATION VIA INTEGRATION WITH IDENTITY MANAGEMENT SOLUTIONS

(75) Inventors: Sourabh Satish, Fremont, CA (US); Brian Hernacki, Mountain View, CA (US); Zulfikar Ramzan, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 494 days.

(21) Appl. No.: 12/059,727

(22) Filed: Mar. 31, 2008

(51) Int. Cl.
*G06F 15/16* (2006.01)
(52) U.S. Cl.
USPC .......................................... 709/231; 707/784
(58) Field of Classification Search
None
See application file for complete search history.

(56) References Cited

U.S. PATENT DOCUMENTS

| | | | | |
|---|---|---|---|---|
| 5,838,978 | A * | 11/1998 | Buzbee ......................... | 717/158 |
| 6,438,550 | B1 * | 8/2002 | Doyle et al. ..................... | 726/2 |
| 6,836,794 | B1 * | 12/2004 | Lucovsky et al. ............. | 709/223 |
| 7,062,567 | B2 * | 6/2006 | Benitez et al. ................ | 709/231 |
| 2001/0034736 | A1 * | 10/2001 | Eylon et al. ................... | 707/200 |
| 2002/0091763 | A1 * | 7/2002 | Shah et al. ..................... | 709/203 |
| 2002/0176418 | A1 * | 11/2002 | Hunt et al. ..................... | 370/389 |
| 2003/0079057 | A1 * | 4/2003 | Ruskin et al. ..................... | 710/1 |
| 2004/0139482 | A1 * | 7/2004 | Hale et al. ..................... | 725/135 |
| 2005/0033843 | A1 * | 2/2005 | Shahi et al. ................... | 709/226 |
| 2006/0080454 | A1 * | 4/2006 | Li ................................. | 709/231 |
| 2008/0027939 | A1 * | 1/2008 | Chalasani et al. ................ | 707/9 |
| 2008/0098006 | A1 * | 4/2008 | Pedersen et al. ................ | 707/10 |
| 2008/0109876 | A1 * | 5/2008 | Hitomi et al. ..................... | 726/2 |
| 2008/0130524 | A1 * | 6/2008 | Volach et al. ................. | 370/259 |
| 2008/0183645 | A1 * | 7/2008 | Burger et al. ................... | 706/12 |
| 2009/0132712 | A1 * | 5/2009 | P et al. ......................... | 709/227 |

FOREIGN PATENT DOCUMENTS

| | | | |
|---|---|---|---|
| WO | WO 0227492 A1 * | 4/2002 | |
| WO | WO 2006042265 A2 * | 4/2006 | |

* cited by examiner

*Primary Examiner* — Augustine K Obisesan
(74) *Attorney, Agent, or Firm* — Brill Law Office; Jeffrey Brill

(57) ABSTRACT

By placing computer specific remotely originated application data under control of a central identity management system, users can seamlessly run remotely originated applications after logging on to different computers in the enterprise. Cached application content received from a streaming server or network file system, as well as additional application specific data (e.g., files created by the application, configuration changes made by the application on the local computer, etc.), can be configured as central identity management system profile object, using a central identity management system such as Active Directory. This data is thus automatically treated as part of the user settings/profile, and made available on any computer within the enterprise. This results in an optimal application experience for users, regardless of which managed computer they logon to within the enterprise.

21 Claims, 1 Drawing Sheet

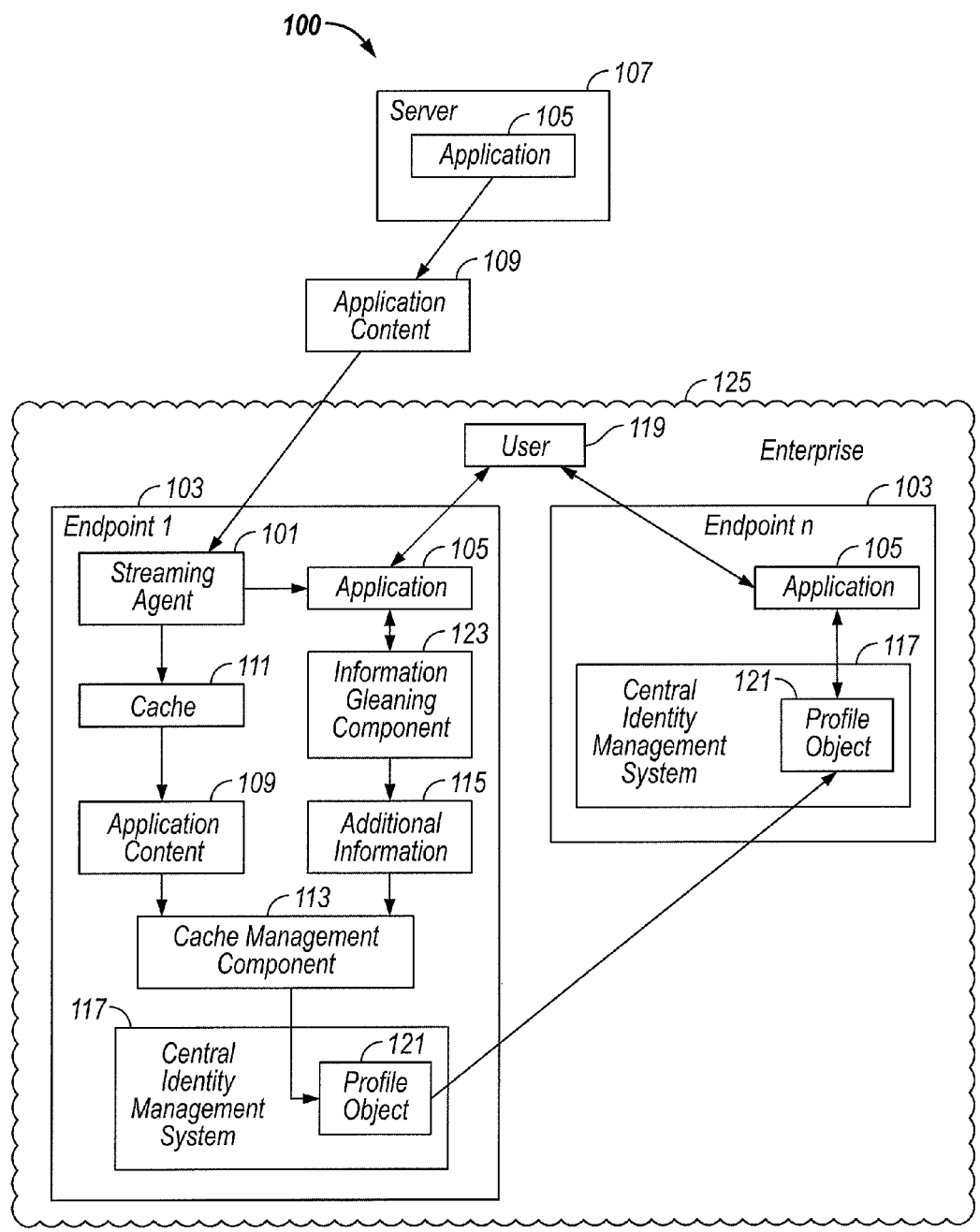

APPLICATION STREAMING AND NETWORK FILE SYSTEM OPTIMIZATION VIA INTEGRATION WITH IDENTITY MANAGEMENT SOLUTIONS

TECHNICAL FIELD

This invention pertains generally to application streaming technology and network file systems, and more specifically to making remotely originated application content and additional information available to users across an enterprise.

BACKGROUND

Central identity management software such as Microsoft's Active Directory® (AD) allows individual users to login to any computer in an enterprise network, and automatically have their personal settings made available. Thus, when a user moves from computer to computer within an enterprise, he or she can continue to work effectively. Users logging on via a central identity management solution are not bound to a single physical machine, but instead can work efficiently anywhere on the network.

AD uses a central database to store information and settings across a domain. AD networks can vary from a small installation with a few hundred objects, to a large installation with millions of objects. An AD structure is a hierarchical framework of objects. The objects fall into three broad categories: resources (e.g., printers), services (e.g., email), and users (user accounts and groups). AD provides information on the objects, organizes the objects, controls access and sets security. Each object represents a single entity—whether a user, a computer, a printer, or a group—and its attributes.

Application streaming provides the ability for an endpoint (e.g., a client computer) to run an application locally that is stored remotely, for example on a server. The server transmits specific portions of the application (e.g., code pages) to the endpoint, as the endpoint needs them. Application streaming offers a number of advantages over running the application on the server. Streaming the application allows the application to execute locally on the endpoint, instead of remotely on the server. This eliminates the need for large farms of servers to provide applications to a plurality of client computers. Application response time to the user is also significantly faster when the application is run locally on the endpoint, as opposed to remotely on the server. Commercial application streaming technology exists today.

A network file system is a computer file system that supports sharing of resources such as files, printers and/or persistent storage over a computer network. Network file systems such as Andrew File System (AFS), NetWare Core Protocol (NCP), and Server Message Block (SMB, also known as Common Internet File System (CIFS)) exist today. Network file systems can share files, including executable files, between servers and endpoints.

Both application streaming technologies and network file systems can be used to execute applications stored on a remote server on a local endpoint. When a server streams application content to an endpoint, the endpoint typically stores that content in a cache, so that the server need not retransmit duplicate application content to the same endpoint. Furthermore, when an application originating from a server runs on an endpoint, the application tends to create various local objects, such as output, log or temporary files, all of which affect the user's experience with the application. The application may also be configured for the local endpoint on which it is running, for example by being set to use a local printer or optimized for the local hardware settings.

Current application streaming technologies and network file systems have no correspondence to user identity. Thus, if a user of a central identity management solution such as AD logs onto a different computer from the one on which the a remote application was run previously, although the user can have his or her user profile automatically loaded on the new computer, the new computer will have no information whatsoever about the cache, created files or local settings of remotely executed applications. Therefore, the user will have to download duplicative application content, recreate local files, and reset application preferences and configuration information. This has a significant negative impact the user's experience.

It would be desirable to have application streaming technology and network file systems that do not, have these problems.

SUMMARY

By placing computer specific remotely originated application data under control of a central identity management system, users can seamlessly run remotely originated applications after logging on to different computers in the enterprise. More specifically, cached application content received from a streaming server or network file system, as well as additional application specific data (e.g., files created by the application, configuration changes made by the application on the local computer, etc.), can be configured as a central identity management system profile object, using a central identity management system such as Active Directory. This data is thus automatically treated as part of the user settings/profile, and made available on any computer within the enterprise. This results in an optimal application experience for users, regardless of which managed computer they logon to within the enterprise.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1 is a block diagram illustrating making remotely originated application content and additional information available to users on any computer across an enterprise, according to other embodiments of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates a system 100 for making remotely originated application content 109 and additional information 115 available to users 119 on any computer 103 across an enterprise 125, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a streaming agent 101 running on an endpoint 103 manages the local execution of an application 105 originating from a remote server 107. An application streaming or network file system on the server 107 transmits chunks of application content 109 to the streaming agent 101, for execution on the endpoint 103. The streaming agent 101 stores received application content 109 in a cache 111, so that specific code pages do not need to be duplicatively transmitted.

In some embodiments, the cache management component 113 extends the cache 111 so that, in addition to received application content 109, the cache 111 also stores additional information 115 associated with the running of the application 105 on the endpoint 103. This additional information 115 can include files created on the endpoint 103 by the application 105 (e.g., intermediate files, temporary files, log files, output files, etc.). The additional information 115 can also include system and/or configuration changes made by the application 105 on the endpoint 103, such as registry settings, application settings, local hardware optimizations, etc.

It is to be understood that what specific additional information 115 to add to the cache 111 is a variable design parameter. It is to be further understood that although in some embodiments the actual cache 111 is extended so as to store the additional information 115, in other embodiments the cached application content 109 and the additional information 115 are stored in other ways (for example in any type of desired data structure(s) or object(s), as desired). The underlying functionality is that the cached application content 109 and the additional information 115 are associated with each other. The implementation mechanics of how they are stored is a variable design parameter, many options for which are within the skill set of one of ordinary skill in the relevant art. The usage thereof within the context of the present invention will be readily apparent to one of such a skill level in light of this specification.

Concerning the capturing of the additional information 115, this can be implemented in a variety of ways. As illustrated in FIG. 1, an information gleaning component 123 gathers additional information 115 associated with the running of the application 105 on the endpoint 103. In some embodiments, this comprises the gleaning component 123 determining which files on the endpoint 103 are created by the application 105, for example by filtering the file system or intercepting pertinent system calls and monitoring the actions of the application 105 and any child processes it spawns. The gleaning module 123 can also intercept relevant system calls or monitor relevant accesses to keep track of configuration changes made by the application 105, e.g., to the registry or the like.

In one embodiment, the technology of the Altiris® Software Virtualization Solution ("SVS") is used to capture modifications made by the application 105 on the endpoint 103. These features of SVS are primarily used for tracking application 105 installation and uninstalling applications 105. However, this technology can be invoked in the context of embodiments of the present invention to track applications 105 originating from remote servers 107 and glean additional information 115 of the type discussed above. The implementation mechanics of these and other methodologies for gleaning additional information 115 concerning remotely originated applications 105 are within the skill set of one of ordinary skill in the relevant art. The usage thereof within the context of the present invention will be readily apparent to one of such a skill level in light of this specification.

The cache management component 113 places the (optionally extended) cache 111 (or other data structure(s), etc.) under the control of a central identity management system 117, such as AD. For example, in the specific case where the cache 111 is extended and the central identity management system 117 being used is AD, the cache management component 113 associates the extended cache 111 with the a user 119 of the endpoint 103 (e.g., the current, logged on user 119), and makes the extended cache 111 an AD profile object 121. Thus, the extended cache 111 and the application content 109 and additional information are available to the user 119 upon logging into any computer 103 on the enterprise 125. The implementation mechanics of placing content under the control of a central identity management system 117 are within the skill set of one of ordinary skill in the relevant art, and the usage thereof within the context of the present invention will be readily apparent to one of such a skill level in light of this specification.

In conclusion, by placing the cache application content 109 and additional information 115 under control of a central identity management system 117, settings can be easily migrated to any computer 103 within the enterprise 125. Because cached application content 107 and changes that an application makes on the local system 103 are carried along with the user profile 121, a user 119 can seamlessly utilize remotely originated applications 105 anywhere on the network 125.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software

What is claimed is:

1. A computer implemented method for making remotely-originated application execution content and additional information available to users across an enterprise, the method comprising the steps of:
- identifying a user at a current endpoint;
- detecting a request from the user for at least one subsection of a streaming application from a remote server for execution on the current endpoint, wherein the streaming application comprises multiple specific subsections remotely-streamed from the remote server to be executed on the current endpoint, wherein each specific subsection comprises a chunk of code of the application to be executed;
- identifying the at least one subsection of the streaming application and gleaned additional information related to the streaming application associated with the user while at a previous endpoint as being placed as a profile object of the user under control of a central identify management system that makes the cached at least one subsection of the streaming application and gleaned information available to the user on any computer across an enterprise; and
- responsive to receiving cached at least one subsection of the streaming application and gleaned additional information from the central identity management system as a profile object of the user, continuing execution of the streaming application for the user in accordance with the at least one subsection and the gleaned additional information at the current endpoint, the gleaned additional information comprising:
  - intercepting relevant system calls to detect creation of at least one file by the application on the endpoint,
  - intercepting relevant system calls to detect at least one configuration change made by the application on the endpoint, and
  - monitoring access to a registry to detect at least one change made by the application on the endpoint.

2. The method of claim 1 wherein gleaning additional information associated with execution of the application on the endpoint further comprises:
- identifying at least one file created by the application on the endpoint.

3. The method of claim 1 wherein gleaning additional information associated with execution of the application on the endpoint further comprises:
- identifying at least one configuration change made by the application on the endpoint.

4. The method of claim 1 wherein gleaning additional information associated with execution of the application on the endpoint further comprises:
- identifying at least one change to a registry made by the application on the endpoint.

5. The method of claim 1 wherein gleaning additional information associated with execution of the application on the endpoint further comprises performing at least one step from a group of steps consisting of:
- filtering a file system to detect creation of at least one file by the application on the endpoint;
- capturing changes made by the application to the endpoint.

6. The method of claim 1 further comprising:
- associating the gleaned additional information with the cached application execution content.

7. The method of claim 6 wherein associating the gleaned additional information with the cached application execution content further comprises:
- extending a cache storing the application execution content to accommodate the gleaned additional information.

8. The method of claim 1 wherein placing cached application execution content and gleaned additional information under control of a central identity management system further comprises:
- associating the cached application execution content and gleaned additional information with a specific user, such that the cached application execution content and gleaned additional information are available to that user from any computer on the enterprise.

9. The method of claim 1 wherein placing cached application execution content and gleaned additional information under control of a central identity management system further comprises:
- configuring the cached application execution content and gleaned additional information a central identity management system profile object.

10. The method of claim 1 wherein receiving, from the server by the endpoint, application content for execution of the application on the endpoint, further comprises:
- receiving, from an application streaming system on the server, specific streamed subsections of the application to be executed on the endpoint.

11. The method of claim 1 wherein receiving, from the server by the endpoint, application content for execution of the application on the endpoint, further comprises:
- receiving, from a network file system on the server, specific shared subsections of the application to be executed on the endpoint.

12. The method of claim 1 wherein the continuing execution of the streaming application comprises:
- continuing execution of the streaming application for the streaming application in accordance with the at least one subsection and the gleaned additional information at the current endpoint; and
- streaming at least one additional subsection of application content for execution on the current endpoint, a source of the at least one additional information differing from the central identity management system.

13. At least one non-transitory computer readable medium storing a computer program product for making remotely originated application execution content and additional information available to users across an enterprise, the computer program product comprising:
- program code for identifying a user at a current endpoint;
- program code for detecting a request from the user for at least one subsection of a streaming application from a remote server for execution on the current endpoint, wherein the streaming application comprises multiple specific subsections remotely-streamed from the remote server to be executed on the current endpoint, wherein each specific subsection comprises a chunk of code of the application to be executed;
- program code for identifying the at least one subsection of the streaming application and gleaned additional information related to the streaming application associated with the user while at a previous endpoint as being placed as a profile object of the user under control of a central identify management system that makes the cached at least one subsection of the streaming application and gleaned information available to the user on any computer across an enterprise; and program code for responsive to receiving cached at least one subsection of the streaming application and gleaned additional information from the central identity management system as a profile object of the user, continuing execution of the streaming application for the user in accordance with the at least one subsection and the gleaned additional information at the current endpoint, the gleaned additional information comprising:

intercepting relevant system calls to detect creation of at least one file by the application on the endpoint, intercepting relevant system calls to detect at least one configuration change made by the application on the endpoint, and monitoring access to a registry to detect at least one change made by the application on the endpoint.

14. The computer program product of 13 wherein the program code for gleaning additional information associated with execution of the application on the endpoint further comprises:

program code for identifying at least one file created by the application on the endpoint.

15. The computer program product of 13 wherein the program code for gleaning additional information associated with execution of the application on the endpoint further comprises:

program code for identifying at least one configuration change made by the application on the endpoint.

16. The computer program product of 13 wherein the program code for gleaning additional information associated with execution of the application on the endpoint further comprises:

program code for identifying at least one change to a registry made by the application on the endpoint.

17. The computer program product of 13 wherein the program code for gleaning additional information associated with execution of the application on the endpoint further comprises program code for performing at least one step from a group of steps consisting of:

filtering a file system to detect creation of at least one file by the application on the endpoint;

capturing changes made by the application to the endpoint.

18. The computer program product of 13 further comprising:

program code for associating the gleaned additional information with the cached application execution content.

19. The computer program product of 18 wherein the program code for associating the gleaned additional information with the cached application execution content further comprises:

program code for extending a cache storing the application execution content to accommodate the gleaned additional information.

20. The computer program product of 13 wherein the program code for placing cached application execution content and gleaned additional information under control of a central identity management system further comprises:

program code for associating the cached application execution content and gleaned additional information with a specific user, such that the cached application execution content and gleaned additional information are available to that user from any computer on the enterprise.

21. The computer program product of 13 wherein the program code for placing cached application execution content and gleaned additional information under control of a central identity management system further comprises:

program code for configuring the cached application execution content and gleaned additional information a central identity management system profile object.

* * * * *